(12) United States Patent
Li et al.

(10) Patent No.: US 12,360,443 B1
(45) Date of Patent: Jul. 15, 2025

(54) DYNAMIC ILLUMINATION CONTROL FOR DEPTH DETERMINATION

(71) Applicant: META PLATFORMS TECHNOLOGIES, LLC, Menlo Park, CA (US)

(72) Inventors: Fengqiang Li, Redmond, WA (US); Zihe Gao, Redmond, WA (US); Michael Hall, Bellevue, WA (US); Zhaoming Zhu, Redmond, WA (US); Shuochen Su, Seattle, WA (US); Huixuan Tang, Redmond, WA (US); Xinqiao Liu, Medina, WA (US); Nicholas Daniel Trail, Bothell, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 906 days.

(21) Appl. No.: 17/519,007

(22) Filed: Nov. 4, 2021

Related U.S. Application Data

(63) Continuation of application No. 16/795,105, filed on Feb. 19, 2020, now Pat. No. 11,195,291.

(51) Int. Cl.
  *G03B 21/14* (2006.01)
  *G01B 9/08* (2006.01)
  *G02B 30/22* (2020.01)
  *G06T 7/00* (2017.01)
  *G06T 7/521* (2017.01)
  *G06T 7/70* (2017.01)

(52) U.S. Cl.
  CPC ............. *G03B 21/14* (2013.01); *G01B 9/08* (2013.01); *G02B 30/22* (2020.01); *G03B 21/142* (2013.01); *G03B 21/147* (2013.01); *G06T 7/521* (2017.01); *G06T 7/70* (2017.01); *G06T 7/97* (2017.01); *G06T 2207/30244* (2013.01)

(58) Field of Classification Search
  CPC .... G03B 21/14; G03B 21/142; G03B 21/147; G02B 30/22; G06T 7/521; G06T 7/70; G06T 7/97; G06T 2207/30244
  USPC ............................................. 353/7
  See application file for complete search history.

(56) References Cited

U.S. PATENT DOCUMENTS

| 10,158,845 B2* | 12/2018 | Zhu ................. G06F 3/013 |
| 10,181,200 B1* | 1/2019 | Chao ............... G02B 5/1828 |
| 10,564,431 B1* | 2/2020 | Chao ............ G02B 27/0172 |
| 11,070,789 B1* | 7/2021 | Gao ............... G01B 11/2527 |
| 2012/0063637 A1 | 3/2012 | Tardif |
| 2016/0086379 A1 | 3/2016 | Sadi et al. |
| 2016/0088280 A1 | 3/2016 | Sadi et al. |

(Continued)

OTHER PUBLICATIONS

Yuanhao H., et al., English Translation of CN107085343B, Published on Jul. 12, 2019, 17 Pages.

*Primary Examiner* — Magda Cruz
(74) *Attorney, Agent, or Firm* — Greenberg Traurig, LLP

(57) ABSTRACT

A depth camera assembly (DCA) optimizes illumination and image capture of a local area to generate depth information of the local area. The DCA determines depth information for a first portion of the local area viewable at a first pose. The DCA is moved from the first pose to a second pose, where a second portion of the local area is viewable and overlaps with the first portion. The overlapping region is not illuminated by the DCA. A non-overlapping portion of the second portion is illuminated, captured, and depth information determined.

20 Claims, 10 Drawing Sheets

(56) References Cited

U.S. PATENT DOCUMENTS

| | | |
|---|---|---|
| 2016/0088282 A1 | 3/2016 | Sadi et al. |
| 2016/0088285 A1 | 3/2016 | Sadi et al. |
| 2016/0088287 A1 | 3/2016 | Sadi et al. |
| 2017/0150021 A1 | 5/2017 | Lee |
| 2018/0205937 A1* | 7/2018 | Zhu .................... H04N 13/254 |
| 2019/0304116 A1 | 10/2019 | Price et al. |
| 2019/0346257 A1 | 11/2019 | Armstrong et al. |
| 2019/0364206 A1 | 11/2019 | Dal Mutto et al. |
| 2020/0355494 A1* | 11/2020 | Rossi ................. G02B 27/4277 |
| 2020/0402310 A1 | 12/2020 | Nidaira et al. |

* cited by examiner

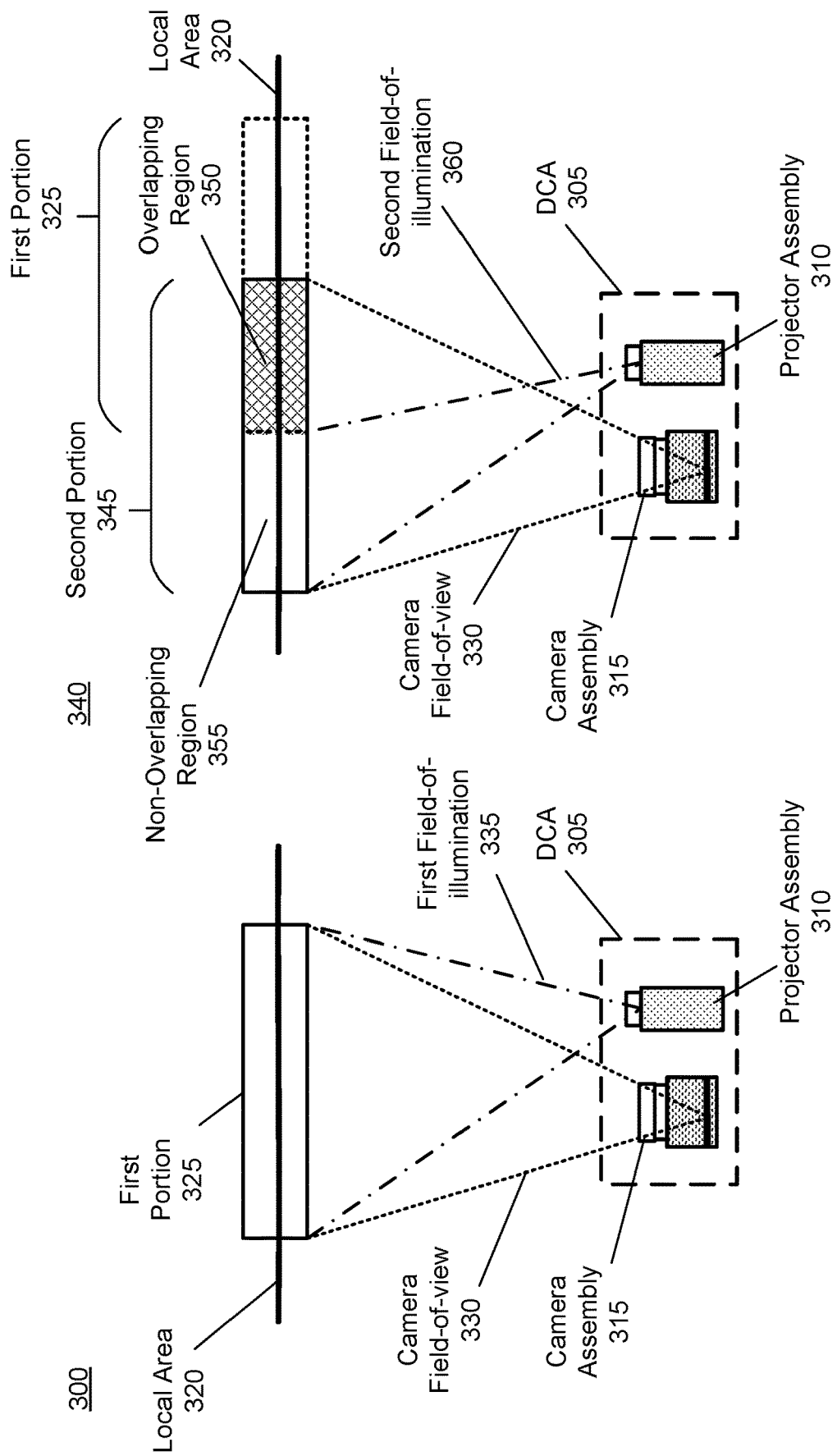

US 12,360,443 B1

DYNAMIC ILLUMINATION CONTROL FOR DEPTH DETERMINATION

CROSS REFERENCE TO RELATED APPLICATIONS

This application is a continuation of co-pending U.S. application Ser. No. 16/795,105, filed Feb. 19, 2020, which is incorporated by reference in its entirety.

FIELD OF THE INVENTION

This disclosure relates generally to artificial reality systems, and more specifically to dynamically controlling illumination to generate depth information for artificial reality systems.

BACKGROUND

Depth cameras are often used to create compelling user experiences in artificial reality systems. However, it can be challenging to determine depth of objects in a local area quickly and accurately while using low power.

SUMMARY

A depth camera assembly (DCA) for depth sensing of a local area is presented herein. The DCA includes a projector assembly, a camera assembly, and a controller. The projector assembly is configured to emit, into a region of the local area, a projection of a structured light pattern at one or more instances of time. The camera assembly includes one or more image devices (e.g., cameras). The camera assembly configured to capture one or more images the region as the region is illuminated at the one or more instances of time. The controller controls the projector assembly and the camera assembly and is configured to instruct the projector assembly to illuminate a region of the local area. The controller may dynamically determine the region to be illuminated.

In some embodiments, the controller determines that a pose of a camera assembly has changed. The change is such that a first portion of the local area covered by a previous image frame of the camera system differs from a second portion of the local area covered by an image frame and the image frame overlaps with the previous image frame. The controller determines a non-overlapping region of the second portion of the local area that does not overlap with the first portion of the local area. The controller instructs the projector assembly to illuminate the non-overlapping region of the local area with a projection of structured light. The one or more imaging devices capture one or more images of the non-overlapping region illuminated with the projection of structured light. The controller generates depth information for the non-overlapping region using the one or more images. In some embodiments, the DCA is integrated into a device (e.g., a headset, smartphone, etc.).

In some embodiments, a method comprises determining that a pose of a camera assembly has changed such that a first portion of the local area covered by a previous image frame of the camera system differs from a second portion of the local area covered by an image frame. The image frame overlaps with the previous image frame. A non-overlapping region of the second portion of the local area is determined. The non-overlapping region does not overlap with the first portion of the local area. The non-overlapping region of the local area is illuminated with a projection of structured light. One or more images of the non-overlapping region illumined with the projection of structured light are captured. Depth information for the non-overlapping region is generated using the one or more images. In one embodiment, a non-transitory computer readable storage medium comprises computer program instructions that when executed by a processor cause the processor to execute the steps of the method.

In some embodiments, a DCA comprises a projector assembly, a camera assembly, and a controller. The projector assembly is configured to emit one or more projections of structured light patterns onto a region of a local area. The camera assembly is configured to capture a set of images of the local area. The controller is coupled to the projector assembly and the camera assembly. The controller is configured to determine that a pose of the depth camera assembly has changed such that a first portion of the local area covered by a previous image frame of the camera assembly differs from a second portion of the local area covered by an image frame. The image frame overlaps with the previous image frame. The controller is configured to determine a non-overlapping region of the second portion of the local area that does not overlap with the first portion of the local area. The controller is configured to send instructions to the projector assembly to illuminate the non-overlapping region of the local area with a projection of structured light, and send instructions to the camera assembly to capture one or more images of the non-overlapping region illumined with the projection of structured light. The controller is configured to generate depth information for the non-overlapping region using the one or more images.

BRIEF DESCRIPTION OF THE DRAWINGS

FIG. 3A is a diagram of a DCA at a first instance of time, in accordance with one or more embodiments.

FIG. 3B is a diagram of the DCA of FIG. 3A at a second instance of time, in accordance with one or more embodiments.

Figure 1A:
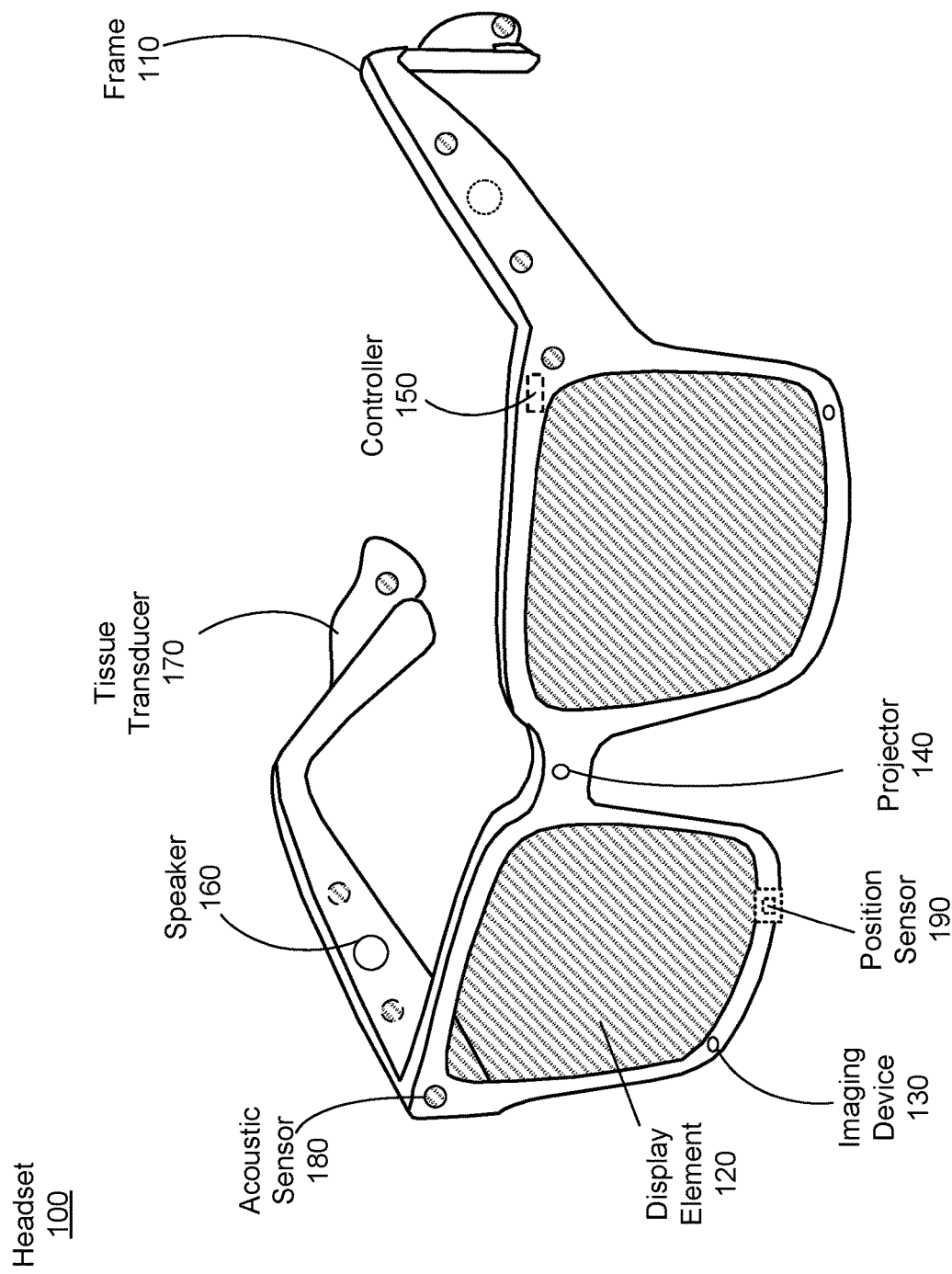
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A DCA is presented herein that uses dynamic illumination control for depth determination. In some embodiments, the DCA may be part of a headset. The DCA may adjust the illumination (i.e., structured light pattern) as the DCA changes pose with time. The DCA comprises a projector assembly, a camera assembly, and a controller. The projector assembly is configured to illuminate the local area with one or more projections that may include structured light patterns. The camera assembly is configured to capture one or more images of the local area and has a camera FOV. The controller is configured to generate instructions to control the DCA, including the projector assembly and the camera assembly, and generate depth information for the local area.

For example, at a first instance of time a first portion of the local area is illuminated by the projector assembly and captured by the camera assembly and depth information is determined by the controller. At a second instance of time, the DCA has moved relative to the local area such that the camera FOV views a second portion of the local area, where the second portion overlaps in part with the first portion. Depth information has previously been determined for an overlapping region contained within the first portion and the second portion. The controller determines a non-overlapping region which is viewable in the camera FOV in the second portion but not the first portion. The controller may instruct the projector assembly to illuminate the non-overlapping region. The controller also may instruct the camera assembly to capture image data for the non-overlapping region. The controller uses the image data to generate depth information for the non-overlapping region. The depth information determined for the first portion and the non-overlapping region of the second portion based on the image data are stored in a depth map.

In some embodiments, the DCA dynamically adjusts projections of the one or more structured light patterns projected to illuminate a region. A projection describes structured light that is projected into the local area across a field of illumination of the projector. A projection may be a single structured light pattern that spans some or all of the entire projection, a plurality of structured light patterns (may all be the same or may have different patterns) that are tiled to span some or all of the illuminated region, or some combination thereof. The structured light patterns may include diffuse light, bars, dots, and other patterns that enable the determination of depth information. The structured light patterns may be infrared (IR) light or visible light. Note, some types of structured light have a feature density. For example, if the structured light is dot based, there is a density associated with the dots.

The depth information is determined based on the captured image data of a region of the local area. Objects in the local area reflect and distort light illuminated by the projector, which is captured in the image data by the camera assembly. The depth information stores a mapping of the surface geometry of the region. Depth information can be determined using known relative positions of the projector assembly and the camera assembly to triangulate of the distance between the camera assembly and the object reflecting the light. In some embodiments, the depth information is computed for each pixel of the captured light in the image data and includes a distance between the camera and the object that reflected the pixel of captured light. The depth information of the region is stored in a depth model of the local area. The depth model can be a three-dimensional model which stores the surface geometry of the local area. That is, the depth model contains the depth information for the region of the local area and other portions of the local area for which depth information has previously been determined.

Conventional methods for depth sensing typically involve a depth camera assembly (DCA) capturing the entire field of view (FOV) at each time instance to generate depth information for the entire field of view at each successive instance of time (even when nothing has changed in area), which can be wasteful of power, such as computational power, data storage power, and illumination power. In contrast, by selectively controlling which regions are illuminated with structured light the DCA presented herein can quickly generate depth information with a relatively low power budget.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a DCA, an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

Note that in some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a region of a field of view of a local area surrounding the headset 100. The DCA includes a camera assembly, a projector assembly, and a controller 150. The projector assembly includes a projector 140. In some embodiments, the projector 140 illuminates the region of the local area with light. The light may be, e.g., structured light (e.g., dot pattern, bars, etc.) in the IR, IR flash for time-of-flight, etc. The camera assembly includes one or more imaging devices 130. In some embodiments, the one or more imaging devices 130 capture images of the region of the local area that include the light from the projector 140. The controller 150 controls the generates instructions for the camera assembly and the projector assembly. The controller 150 dynamically adjusts the region of the local area being illuminated with structured light based on changes to the field of view. As illustrated, FIG. 1A shows a controller 150, a single projector 140 and two imaging devices 130. In alternate embodiments, there is some other number of imaging devices 130 or projectors 140. The DCA is discussed in greater detail in relation to FIG. 2.

The controller 150 computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the projector 140), some other technique to generate depth of a scene, or some combination thereof.

The audio system provides audio content. The audio system includes a transducer array, a sensor array, and an audio controller. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller processes information from the sensor array that describes sounds detected by the sensor array. The audio controller may comprise a processor and a computer-readable storage medium. The audio controller may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a depth model of the local area, update a depth model of the local area, or some combination thereof. Furthermore, the position sensor 190 tracks the position (e.g., location and pose) of the headset 100 within the room. Additional details regarding the components of the headset 100 are discussed below in connection with FIG. 6.

Figure 1B:
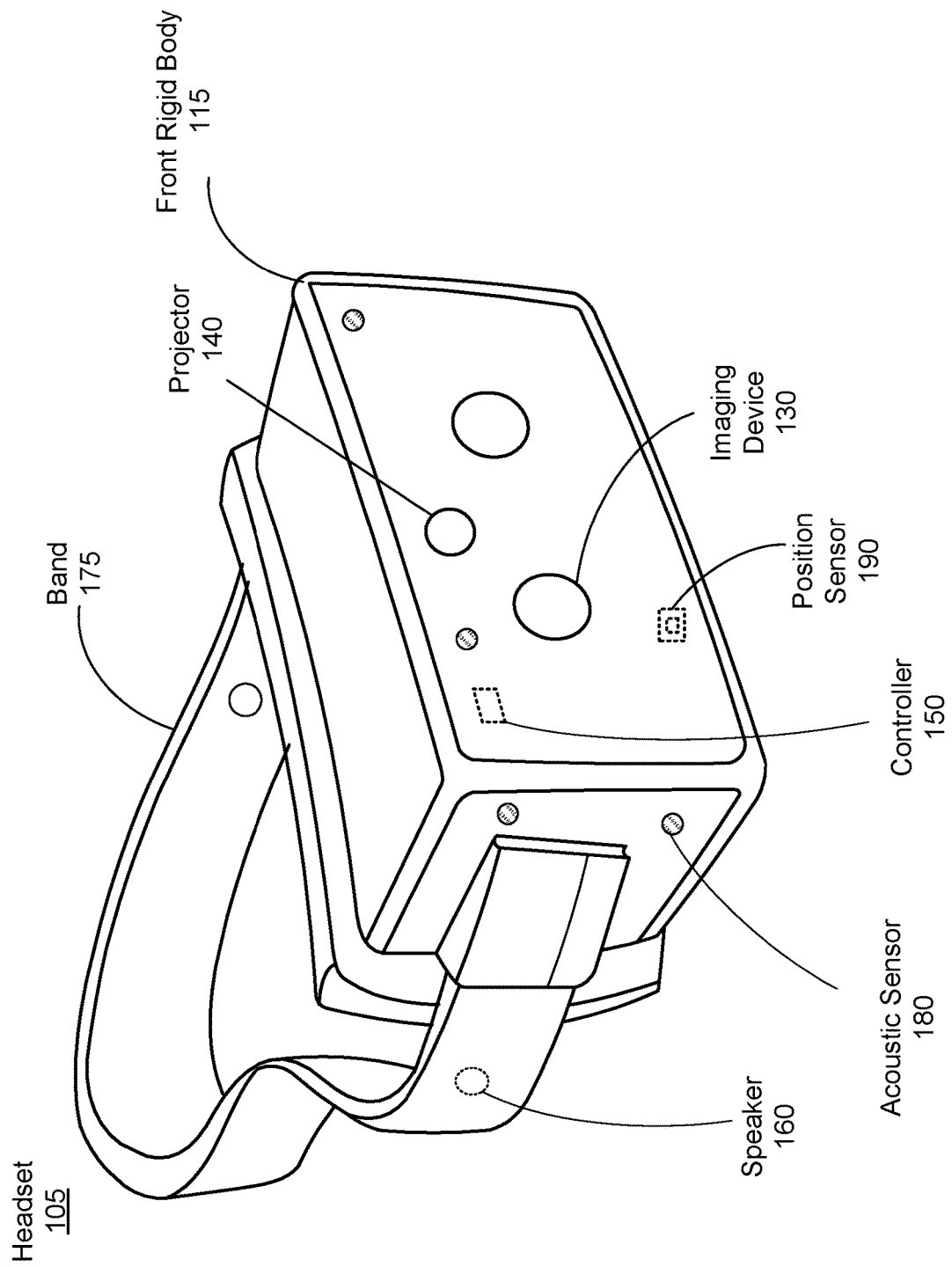
FIG. 1B is a perspective view of a headset implemented as a head-mounted display, in accordance with one or more embodiments.

FIG. 1B is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, the DCA, an audio system, and a position sensor 190. FIG. 1B shows the projector 140, a plurality of the speakers 160, a plurality of the imaging devices 130, a plurality of acoustic sensors 180, and the position sensor 190. The speakers 160 may be located in various locations, such as coupled to the band 175 (as shown), coupled to front rigid body 115, or may be configured to be inserted within the ear canal of a user.

Figure 2:
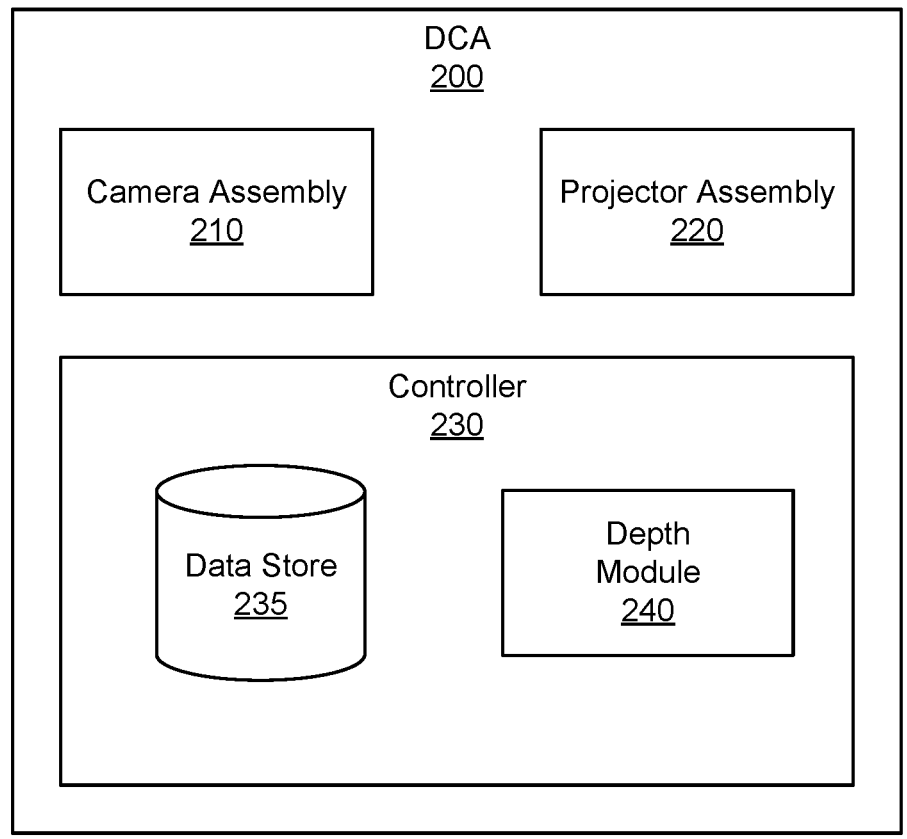
FIG. 2 is a block diagram of an audio system, in accordance with one or more embodiments.

FIG. 2 is a block diagram of an DCA 200, in accordance with one or more embodiments. The DCA 200 generates depth information about a region of a local area. The DCA 200 may use depth information to generate a depth model of the local area. In the embodiment of FIG. 2, the DCA 200 includes a camera assembly 210, a projector assembly 220, and a controller 230. Some embodiments of the DCA 200 have different components than those described here. Similarly, in some cases, functions can be distributed among the components in a different manner than is described here. The DCA discussed in relation to FIG. 1A or FIG. 1B may be an embodiment of the DCA 200.

The camera assembly 210 captures one or more images of the region of the local area. The camera assembly 210 includes one or more imaging devices (e.g., cameras), such as the one or more imaging devices 130 as discussed in relation to FIGS. 1A and 1B. The camera assembly 210 is sensitive to light in at least the band of light produced by the projector assembly 220, and in some embodiments, is sensitive to other light. For example, the camera assembly 210 may be sensitive to IR light, some or all of the visible spectrum of light (e.g., red-green-blue (RGB) light), other parts of the electromagnetic spectrum, or some combination thereof (e.g., RGB and IR).

The projector assembly 220 illuminates the region of the local area. The projector assembly 220 includes one or more projectors, such as the projector 140. The projector assembly 220 includes one or more light sources that that emit light at specific bands (e.g., a range of wavelengths of light). Example bands of light emitted by one or more light sources in the sparse projection system 136 include a visible band (~380 nm to 750 nm), an IR band (~750 nm to 1 mm), an ultraviolet band (10 nm to 380 nm), another portion of the electromagnetic spectrum, or some combination thereof. The one or more light sources may be a light emitting diode (LED), vertical cavity surface emitting laser (VCSEL), an edge emitting laser, a superluminous LED (SLED), a tunable laser, or any combination thereof.

In some embodiments, the projector assembly 220 includes one or more optical elements that produce one or more structured light patterns. The one or more optical elements may be one or more diffraction gratings, a diffuser, a spatial light modulator, some element that forms structured light, or some combination thereof. In some embodiments, the projector assembly 220 also includes one or more refractive lenses, temperature sensors, calibration electrically erasable programmable read-only memories (EEPROMs), and encoders (e.g., one or more optical encoders or magnetic encoders) that determine positions of the one or more optical elements. In some embodiments, the projector assembly 220 includes a laser array with individual lasers. The individual lasers may be independently addressable or may be addressable as groups. In some embodiments, the projector assembly 220 includes a laser driver and has multiple independently addressable current sources or voltage sources configured to drive the laser array or some subset of individual lasers thereof. In some embodiments, the projector assembly 220 includes a photonic integrated circuit that has an on-chip routing and switching device configured to dynamically control illumination by the laser array or some subset of individual lasers thereof.

The projector assembly 220 is configured to emit one or more projections, which may each include one or more structured light patterns. The projector assembly 220 illuminates the local area with a projection at a successive instance of time at a frequency. In some embodiments, some of the optical elements (e.g., diffraction gratings) are used to generate different structured light patterns. For example, a first optical element may be used to generate a first structured light pattern, and a different optical element may be used to generate a second structured light pattern that is different than the first structured light pattern. And in some cases the first structured light pattern may be substantially the same, except that the density of features within each structured light pattern is different. Alternatively, some of the optical elements may be associated with a same structured light pattern. Structured light patterns may include, e.g., dot pattern, line pattern, sinusoid pattern, grid pattern, multi-tone pattern, diffuse light (e.g., for time-of-flight operation), other types of structured light patterns, or some combination thereof. In some embodiments, the projector assembly 220 creates a structured light pattern with a feature density, and varies the feature density at successive instances of time. In some embodiments, the projector assembly 220 creates tiled patterns with active tiles that each contain a structured light pattern and inactive tiles contain no structured light, where active and inactive tiles alternate at successive instances of time. Examples of projections include one or more structured light patterns projected by the projector assembly 220 are discussed in greater detail with respect to FIGS. 4A-4C, below.

The controller 230 controls operation of the DCA 200. In the embodiment of FIG. 2, the controller 230 includes a data store 235 and a depth module 240. The controller 230 may be located inside a headset, in some embodiments. Some embodiments of the controller 230 have different components than those described here. Similarly, functions can be distributed among the components in different manners than described here. For example, some functions of the controller may be performed external to the headset.

In one embodiment, the controller 230 instructs the projector assembly 220 to emit one or more projections into a local area at particular times. The controller 230 instructs the camera assembly 210 to capture images of the local area at particular capture intervals. The capture intervals include the illumination intervals, but may also include additional intervals when the local area is not being illuminated with a projection. Accordingly, the captured image frames include images of the local area illuminated with a projection, and may also include images of the local area not illuminated with a projection.

The particular times at which successive projections are projected by the projector assembly 220 are determined by the controller 230. The particular times may occur at a frequency. The frequency may be a pre-defined rate of illumination and capture, or may be a pseudo-random rate of illumination and capture. In one embodiment, the frequency is adaptive based on input data. Input data may include motion data and/or image data. For example, the frequency may adapt to be a higher rate of illumination and capture responsive to motion data indicating that the DCA 200 has moved. Additionally, or alternatively, the frequency may adapt to be a higher rate of illumination and capture responsive to successive frames of image data indicating objects in the local area have moved or that the view of or objects in the local area have changed. Similarly, the frequency may adapt to be a lower rate of illumination and capture responsive to limited or no motion and/or change in the image data.

For example, at a first instance of time, the projector assembly 220 illuminates a first FOV of the local area with a first structured light pattern. The first FOV includes a hand of a user of the DCA 200, among other objects. The camera assembly 210 captures image data of the first FOV at the first instance of time. At a second instance of time, which occurs after a period specified by the frequency, the projector assembly 220 illuminates the first FOV again and the camera assembly 210 captures image data again. Between the first instance of time and the second instance of time, the user moves the hand. Responsive to the image data captured by the camera assembly 210 indicating the movement of the hand, the frequency adaptively increases (i.e., the period decreases). In one embodiment, the DCA 200 may receive motion data from a device attached to or held by the hand and adaptively increases the frequency.

The data store 235 stores data for use by the DCA 200. Data in the data store 235 may include images captured of the local area by the camera assembly 210, instructions for one or more projections, which may include one or more structured light patterns and, if applicable, an associated feature density, as well as instructions for creating a tiled pattern, depth information associated with pixels of one or more regions, one or more depth models, and other data relevant for use by the DCA 200, or any combination thereof. In some embodiments, the data store 235 contains data regarding a pose of the DCA 200, such as a change in pose.

The depth module 240 determines depth information for the local area. The depth module 240 sends instructions to the projector assembly 220 to illuminate a region of the local area. The depth module 240 sends instructions to the camera assembly 210 to capture image data of the region of the local area. For example, while the region is illuminated by the projector assembly 220, the depth module 240 sends instructions to the camera assembly 210 to capture an image of the region. The depth module 240 uses the captured image data to generate depth information for the region of the local area. The depth module 240 repeats the illumination and capture of image data periodically at successive instances of time. In some embodiments, the depth module 240 maps the depth information for the region into a depth model for the local area. The depth module 240 may use various depth sensing techniques, such as structured light-based depth sensing, time-of-flight (TOF) based depth sensing, active stereo vision depth sensing, hybrid depth sensing combining structured light based depth sensing and TOF based depth sensing, etc. to determine the depth of the region.

For example, in one embodiment, the depth module 240 uses a triangulation of structured light and TOF information to generate depth information of the region. The structured light is emitted by the projector assembly 220 and the TOF information is captured by the camera assembly 210. The depth information is computed for each pixel in the captured image by triangulating a location of the pixel in on a sensor pane and the TOF information with a known location of the projector assembly 220. The depth information for the region of the local area is input into a depth model of the local area.

Repeating such calculations of depth information for every pixel in a FOV at every instance of time is computationally inefficient. Accordingly, the depth module 240 does not need to compute depth over the entire FOV when there are overlapping regions in successive image frames of the local area. The data store 235 stores a depth model of the local area with determined depth information for one or more regions of the local area, for example, in the form of a three-dimensional mapping.

In one embodiment, the depth module 240 receives a change in pose of the DCA 200. For example, the depth module 240 determines a change in pose based on a comparison between a current image of the local area and a previously captured image of the local area. In another example, the DCA 200 receives the information from a position sensor, such as the position sensor 190 as described in relation to FIGS. 1A and 1B. In a further example, the DCA 200 includes a PCA (e.g., described in relation to FIG. 1A), and the DCA uses SLAM to determine pose. The change in pose may indicate that the DCA 200 has moved from a first pose with a first FOV of the local area to a second pose with a second FOV of the local area. The first FOV and the second FOV overlap such that an overlapping region of the local area is included within both the first FOV and the second FOV. In some embodiments, there is a threshold minimum size for the overlapping region, where the threshold minimum indicates a substantial change in the field of view. For example, a user wearing a device with the DCA 200 may have turned their head or body to shift from the first FOV to the second FOV. In some embodiments, the depth module 240 is predictive and can determine a change in pose, and the corresponding overlapping region, based on motion data such as a rate of movement of the DCA 200. In a previous timestep, the depth module 240 determined depth information for the first FOV and included the depth information in the depth model of the local area.

Responsive to the change in pose, the depth module 240 determines whether there is an overlap between the first FOV and the second FOV. The depth module 240 may use the change in pose to determine an overlapping region. For example, if the change in pose is a distance along an axis, the depth module 240 determines a corresponding shift in FOV along the same axis. The corresponding shift in FOV is used to determine the overlapping region of the first FOV that is also included in the second FOV. Complementarily, the portion of the second FOV that is not included in the overlapping region is determined to be a non-overlapping region.

In another embodiment, the depth module 240 may use the depth model of the local area determined in a previous timestep to determine the overlapping region. For example, the previously determined depth model of the local area is projected onto the second FOV according to the change in pose. The depth module 240 determines the overlapped region by the occlusion of objects by the depth model. That is, the overlapped region is the portion of the second FOV that is occluded by the projection of the depth model and the non-overlapping region is the portion of the second FOV that is not occluded.

In some embodiments, the depth module 240 determines the non-overlapping region prior to or without determining the overlapping region. For example, the depth module 240 uses the change in pose to determine portions of the second FOV that are new, which include the non-overlapping region. In one embodiment, the change in pose includes a shift in pose of the DCA 200, which is used by the depth module 240 to determine the non-overlapping region of the second FOV. In another embodiment, the depth module 240 uses an image comparison between the first FOV and the second FOV to determine the non-overlapping region. In another example, the depth module 240 uses motion data to determine the non-overlapping region. The overlapping region can be determined complementarily from the second FOV and the non-overlapping region. That is, the portion of the second FOV not included in the overlapping region is the non-overlapping region.

The depth module 240 generates and sends instructions to the projector assembly 220 to illuminate the non-overlapping region of the second FOV. The depth module 240 generates and sends instructions to the camera assembly 210 to capture image data of the non-overlapping region of the second FOV while the region is illuminated by the projector assembly 220. The depth module 240 uses the captured image data to generate depth information for the non-overlapping region. The depth module 240 updates the depth model with the determined depth information for the non-overlapping region. Accordingly, the depth model contains depth information for the entirety of the second FOV based on the depth information determined for the overlapping region in the first FOV and the non-overlapping region that was subsequently determined. FIGS. 3A and 3B give a further example embodiment of the DCA 200 in different poses at successive instances of time.

FIG. 3A is a diagram 300 of a DCA 305 at a first instance of time, in accordance with one or more embodiments. The DCA 305 is an embodiment of the DCA 200. The DCA 305 includes a projector assembly 310 and a camera assembly 315. The projector assembly 310 is an example of a projector of the projector assembly 220 and the camera assembly 315 is an example of imaging devices of the camera assembly 210.

The DCA 305 is positioned within a local area 320. A first portion 325 of the local area 320 is viewable by the DCA 305. That is, the camera assembly 315 has a camera FOV 330 that views the first portion 325 of the local area 320. The projector assembly 310 illuminates the first portion 325 of the local area 320 over a first field of illumination (FOI) 335 with a projection (e.g., a structured light pattern) at a first instance of time. In the illustrated embodiments, the camera FOV 330 of the camera assembly 315 is constant and a FOI of the projector assembly 310 can vary. Note in alternate embodiments, the FOV 330 of the camera assembly 315 may also vary. In the embodiment of FIG. 3A, the first FOI 335 is matched to the camera FOV 330. As described below with regard to FIG. 3B, a FOI of the projector assembly 310 may be less than the camera FOV 330 of the camera assembly 315. And in some embodiments (not shown), a FOI of the projector assembly 310 may be larger than the camera FOV 330 of the camera assembly 315. The projection is reflected from the first portion 325 of the local area 320. The camera assembly 315 captures one or more images of the first portion 325 of the local area 320 that is illuminated with the projection. The DCA 305 generates depth information associated with the first portion 325 of the local area 320 based on the one or more images and the known relative locations of the projector assembly 310 and the camera assembly 315. The depth information of the first portion 325 may be stored in a depth model of the local area 320.

FIG. 3B is a diagram 340 of the DCA 305 OF FIG. 3A at a second instance of time, in accordance with one or more embodiments. The DCA 305 has moved relative to the local area 320. A change in pose of the DCA 305 may be determined using SLAM of the local area 320. Based on the change in pose, the DCA now views a second portion 345 of the local area 320. More specifically, the camera FOV 330 of the camera assembly 315 views the second portion 345 of the local area 320. The second portion 345 at the second instance of time is different from the first portion 325 at the first instance of time.

The first portion 325 and the second portion 345 have an overlapping region 350. That is, the overlapping region 350 is viewable by the DCA 305 in both the first portion 325 at the first instance of time and in the second portion 345 at the second instance of time. Accordingly, depth information about the overlapping region 350 has already been determined for the first portion at the first instance of time and stored in the depth model. Because the depth information about the overlapping region 350 has previously been determined, when the DCA 305 moves relative to the local area 320, a new depth of the overlapping region 350 can be readily computed based on the change in pose of the DCA 305. That is, depth information about the overlapping region 350 as stored in the depth model is translated based on the change in pose of the DCA 305. Depth information about the overlapping region 350 does not need to be re-determined based on illuminating and capturing new image data.

The second portion 345 of the local area 320 has a non-overlapping region 355. The non-overlapping region 355 is the part of the second portion 345 that is not part of the first portion 325. In other words, the non-overlapping region 355 is the complement to the overlapping region within the second portion 345. Depth information has yet to be determined for the non-overlapping region 355. The projector assembly 310 has a second FOI 360 to illuminate the non-overlapping region 355 with structured light at the second instance of time. The DCA 305 determines the second FOI 360 of the projector assembly 315 to illuminate the non-overlapping region 355 without necessarily illuminating the overlapping region 350. The overlapping region 350 is not included in the second FOI 360 of the projector assembly 310, as indicated in the diagram 340. In alternate embodiments, the FOI 360 illuminates beyond the boundaries of the non-overlapping region 355 into a small border region between the non-overlapping region 355 and surrounding local area 320, which may include part of the overlapping region 350. The structured light is reflected by the non-overlapping region 355 and is captured by the camera assembly 315. The camera assembly 315 captures a second image of the second FOV 345. That is, the projector assembly 310 illuminates the non-overlapping region 355 with structured light and the camera assembly 315 captures the second image of the entire second portion 345, as depicted in the diagram 340. In another embodiment, the camera assembly 315 has a variable camera FOV and captures an image of only the non-overlapping region 355 that corresponds to the second FOI 360 of the projector assembly 310. The DCA 305 determines depth information associated with the non-overlapping region 355 based on the second image of the non-overlapping region 355 and the known relative locations of the projector assembly 310 and the camera assembly 315. The depth information of the non-overlapping region 355 is stored in a depth model of the local area 320. That is, subsequent to the second instance of time, the depth model of the local area 320 contains depth information for the first portion 325 and the second portion 345.

Figure 4A:
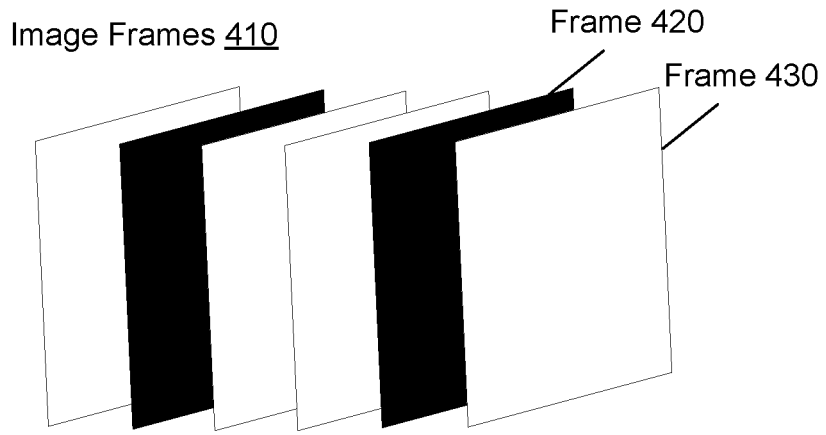
FIG. 4A is a diagram of an example series of image frames produced by a DCA, in accordance with one or more embodiments.

FIG. 4A is a diagram of an example series of image frames 410 produced by a DCA, in accordance with one or more embodiments. The DCA includes a camera assembly and a projector assembly and may, for example, be the DCA 200 of FIG. 2. The series of image frames 410 duty cycle between an on frame 420 and an off frame 430. That is, the on frame 420 is a structured light pattern and the off frame 430 is the absence of a structured light pattern. In some embodiments, the on frame 420 and off frame 430 cycle at a pseudo-random rate. In other embodiments, the on frame 420 and off frame 430 cycle at a pre-defined frequency.

The series of image frames 410 save power by alternating between an on frame 420 and an off frame 430, as opposed to conventional methods of always having the projector assembly on. Duty cycling the on frame 420 and off frame 430 enables the DCA to maintain accuracy as compared to the conventional always-on projector. In one example, the on frame 420 and the off frame 430 are captured at a rate such that the on frame 420 is projected once for every four times the off frame 430 is projected as compared to the always-on projector assembly has a root-mean square error (RMSE) in the range of 0.01-0.015 meters. Additionally, the computational complexity and time for producing the series of image frames 410 is relatively low.

Figure 4B:
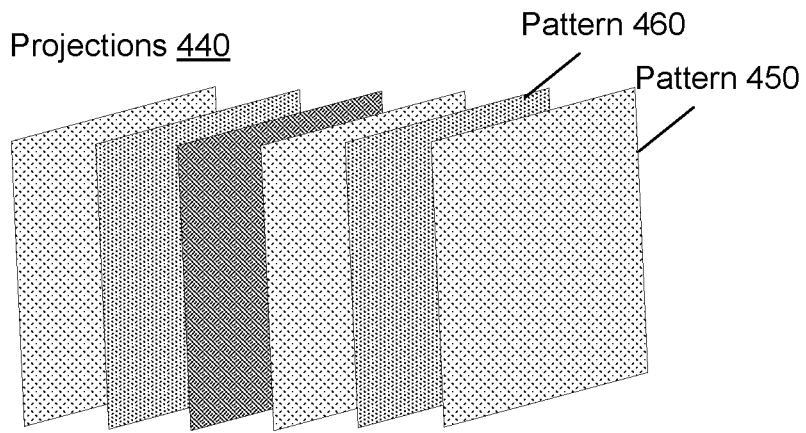
FIG. 4B is a diagram of example projections produced by a DCA, in accordance with one or more embodiments.

FIG. 4B is a diagram of example projections 440 produced by a DCA, in accordance with one or more embodiments. The DCA includes a camera assembly and a projector assembly and may, for example, be the DCA 200 of FIG. 2. The projections 440 include a plurality of structured light patterns, each structured light pattern having a feature density. In the embodiment shown in FIG. 4B, the projections 440 include a plurality of dot-based structured light patterns having different pattern densities in successive projections. In other embodiments, the structured light patterns may be bars, curved lines, any other diffuse light pattern, or any combination thereof where successive projections vary in feature density. For example, the dots in a pattern 450 are less dense than dots in a pattern 460. In one embodiment, the dot densities in patterns 450, 460 are pseudo-random.

In another embodiment, the pattern densities are adaptive to be denser about an object of interest in a frame. For example, in a first instance of time the DCA illuminates a region of a local area with the pattern 450, where the local area that includes an object of interest, such as a hand. Subsequent to the first instance of time the object of is moved substantially within the local area, such as the hand reaching outwards. The DCA identifies that the hand has moved and adapts the feature density to pattern 460. At a second instance of time, subsequent to the first instance of time, the DCA illuminates the local area with the pattern 460, which is denser than the pattern 450. The feature density may subsequently revert to less dense if the object of interest does not move (e.g. the hand stays still) or if the object of interest is entirely removed from a FOV of the DCA (e.g., the hand exits the FOV entirely). In some applications, a higher pattern density is needed to identify finer features or movements thereof. For example, when a hand is close to the DCA, a relatively coarse pattern density is sufficient to obtain depth data of the hand and fingers. In a subsequent timestep, the hand is moved further away. In the subsequent time step a finer pattern density is necessary to obtain depth data of the hand and fingers since these features are now relatively small in the FOV. The patterns 450, 460 may be cycled at pseudo-random rate or a pre-defined frequency.

The projections 440 save power by dynamically adjusting between denser and less dense pattern densities. A denser pattern requires more power to produce, but generates a higher accuracy in resultant determined depth information. The projections 440 enable power-saving lower density patterns (e.g., pattern 450) to be supplemented by accuracy-gaining denser patterns (e.g., pattern 460) that are interspersed in the projections 440. As movement occurs, additional accuracy-gaining denser patterns can be added to the projections 440 to increase accuracy. Conversely, when limited movement occurs, additional power-saving lower density patterns can be inserted into the projections. Additionally, the computational complexity and time for producing the projections 440 is relatively low.

Figure 4C:
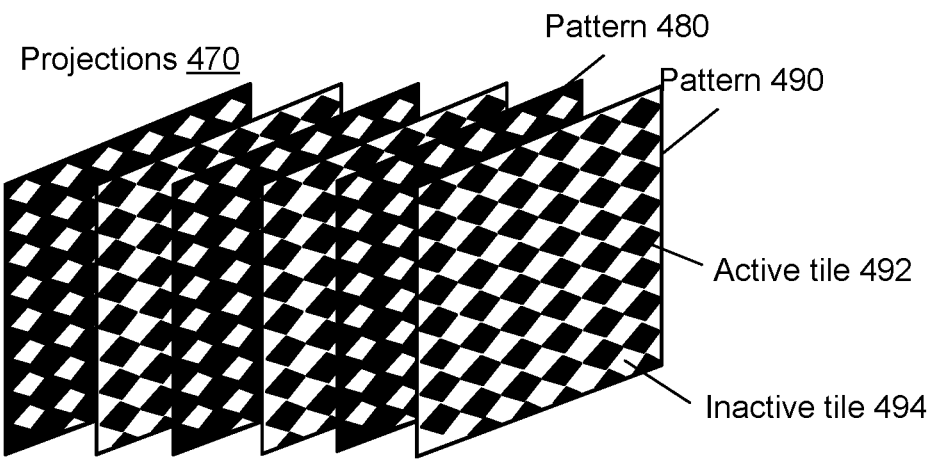
FIG. 4C is a diagram of example projections produced by a DCA, in accordance with one or more embodiments.

FIG. 4C is a diagram of example projections 470 produced by a DCA, in accordance with one or more embodiments. The DCA includes a camera assembly and a projector assembly and may, for example, be the DCA 200 of FIG. 2. The DCA may selectively tile one or more structured light patterns to span some or all of a region of the local area within a FOI of the projector assembly. The projections 470 include tiled patterns, where a tiled pattern describes which tiles are active tiles 492 (area covered by tile illuminated with a structured light pattern) and which tiles are inactive tiles 494 (area covered by tile not illuminated with a structured light pattern) within a particular projection. The tiled patterns alternate in the projections 470 such that each active tile 492 and inactive tile 494 is toggled on and off in successive projections in the projections 470. That is, a pattern 480 has a tiled pattern where alternating tiles within the projection are active tiles 492 and inactive tiles 494. A subsequent pattern 490 has a complementary tiled pattern of tiles, where active tiles 492 in pattern 480 are inactive tiles 494 in pattern 490, and vice versa. In one embodiment, the size and/or shapes of active tiles 492 and inactive tiles 494 in the patterns 480, 490 are pseudo-random. The DCA may adjust the tiled pattern based on, e.g., detection of an object of interest within the local area. For example, the DCA may adjust the tiled pattern of a projection such that active tiles 492 cover the object of interest, and inactive tiles 494 are used elsewhere. For example, active tiles 492 may be adapted to more densely cover a hand in a field of view of the DCA. Additionally, in some embodiments, the structured light pattern projected within the active tiles 492 may change to a different structured light pattern or change in feature density. For example, in some embodiments, a first active tile has a first structured light pattern (e.g., dots) at a first pattern density and a second active tile has a second structured light pattern (e.g., bars) at a second pattern density. The frames 480, 490 may be toggled on and off at pseudo-random rate or a predefined frequency.

The projections 470 save power by moderating the light emitted while maintaining accuracy. That is, as the DCA illuminates a region of a local area with the projections 470, the region is divided into active tiles that are illuminated and inactive tiles that are not currently illuminated. In a subsequent instance of time, the projection alternates the tiled pattern such that active tiles become inactive tiles, and vice versa. At each instance of time, only part of the region is illuminated (e.g., half), thereby saving power. Simultaneously, high accuracy is maintained since within two timesteps every part of the region will be illuminated and thereby depth information determined. As the DCA proceeds through successive projections in the projections 370, toggling on and off each tile in each successive timestep, depth information is determined for the region with a relative high accuracy, resulting in high performance. Additionally, the computational complexity and time for producing the projections 440 is relatively low.

Figure 5:
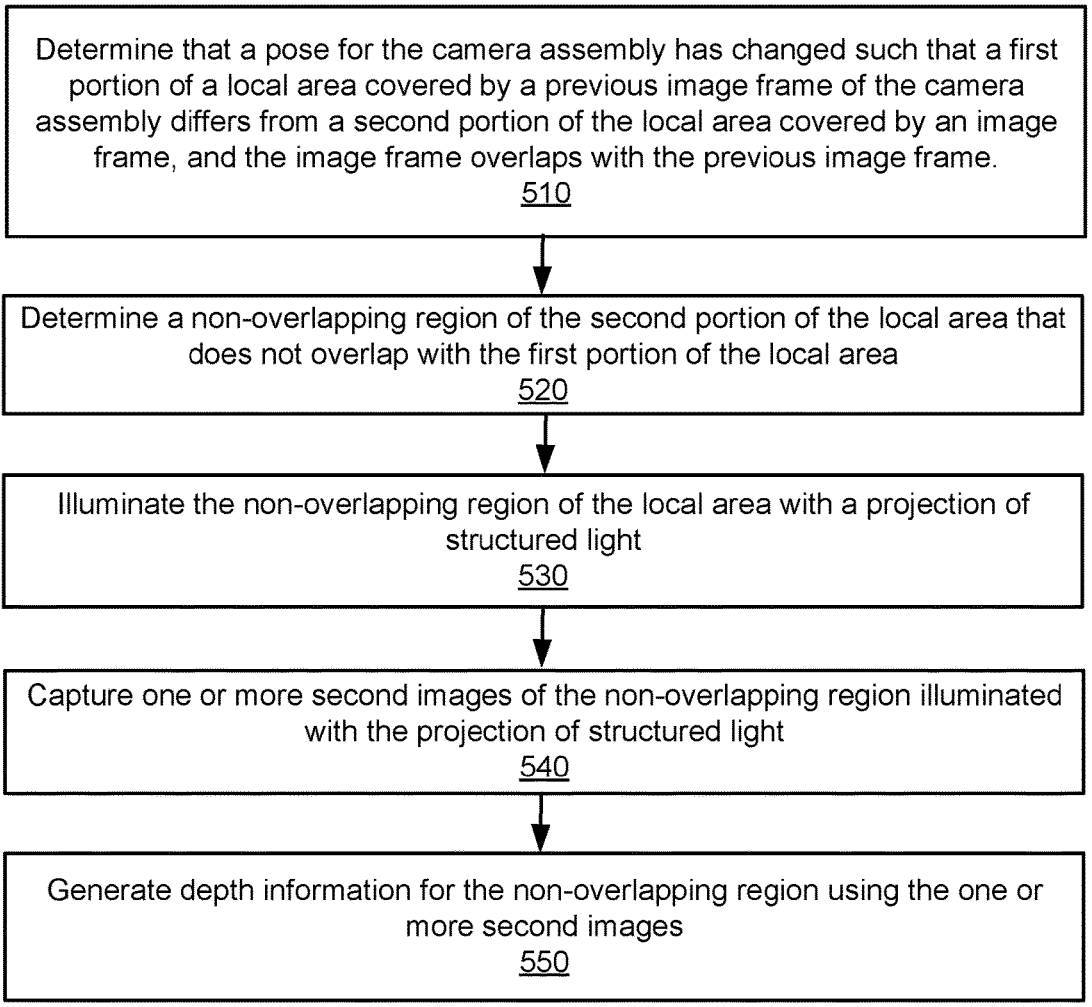
FIG. 5 is a flowchart illustrating a process for determining depth information, in accordance with one or more embodiments.

FIG. 5 is a flowchart of a process 500 for determining depth information, in accordance with one or more embodiments. The process shown in FIG. 5 may be performed by components of a DCA (e.g., DCA 200, or DCA 305), such as a camera assembly, a projector, and/or a controller. Other entities may perform some or all of the steps in FIG. 5 in other embodiments. Embodiments may include different and/or additional steps, or perform the steps in different orders.

The DCA determines 510 that a pose for the camera assembly has changed such that a first portion of a local area covered by a previous image frame of the camera assembly differs from a second portion of the local area covered by an image frame. The image frame is a more recent image frame than the previous image frame, and the image frame overlaps with the previous image frame. The previous image frame is not necessarily the immediately preceding frame, and may be an image frame captured at any previous instance of time. For example, there may be intermediary image frames and associated image data captured between the previous image frame and the image frame.

To generate the previous image frame, the DCA illuminated the first portion of the local area using a projector assembly (e.g., the projector assembly 220). The DCA captured one or more first images of the first portion of the local area using a camera assembly (e.g., the camera assembly 210). Note that the camera assembly may capture images while the projector assembly is illuminating the first portion of the local area, and in some embodiments, may additionally capture one or more images of the first portion of the local area while it is not illuminated by the projector assembly. In some embodiments, the DCA determined depth information for the first portion of the local area using the one or more first images. For example, the DCA may have determined, via a controller (e.g., the controller 230), the depth information for the first portion using various depth-sensing techniques, such as structured light-based depth sensing, TOF-based depth sensing, active stereo vision depth sensing, or a hybrid depth sensing combining structured light-based depth sensing and TOF-based depth sensing. The determined depth information for the first portion may be stored in a depth model for the local area. The depth information may be used to determine a pose for the DCA with respect to the first portion of the local area.

The DCA determines the pose for the camera assembly has changed using the image frame of the second portion of the local area and a pose determination technique. The controller may use, e.g., image comparison, SLAM, position data, motion data, some other technique, or any combination thereof, to determine a pose of the DCA associated with the image frame of the second portion of the local area. The DCA then compares the determined pose to the pose of the DCA associated with the first portion of the local area to determine whether a change in pose has occurred. For example, a position sensor, such as position sensor 190, detects motion of the DCA. The position sensor may provide SLAM for a pose of the DCA, updating the model of the local area described in relation to the position sensor 190. In this example, when the DCA moves from viewing the first portion to the second portion, the position sensor senses a change in pose and uses SLAM to track and quantify the change in pose.

The DCA determines 520 a non-overlapping region of the first portion of the local area that does not overlap with the second portion of the local area. The controller may use the determined 510 change in pose to determine the non-overlapping region. For example, a change in pose of the DCA indicates a parallel change in FOV that can be used to determine the non-overlapping region. The controller may determine an overlapping region and determine the non-overlapping region by complement of the second FOV. In one example, the second portion of the local area overlaps with the first portion of the local area. In this example, the DCA may determine an overlapping region of the local area that is within both the first portion and the second portion as well as a non-overlapping region of the local area that is only within the second portion. In another example, the second portion of the local area does not overlap with the first portion of the local area. In this example, the DCA determines that there is no overlapping region and the entirety of the second portion is the non-overlapping region of the local area.

The DCA illuminates 530 the non-overlapping region of the local area with a projection of structured light. Note that while the non-overlapping region is illuminated, the overlapping region is not illuminated. The projector assembly of the DCA is configured to illuminate 560 the non-overlapping region in response to instructions from the controller. In some embodiments, the projector assembly illuminates 560 using one or more structured light patterns.

The DCA captures 540 one or more images of the non-overlapping region of the local area. In some embodiments, the DCA captures 540 one or more images of the second portion of the local area covered by the image frame, which includes the non-overlapping region and the overlapping region. The camera assembly of the DCA is configured to capture 540 the one or more second images in accordance with instructions from the controller.

The DCA generates 550 depth information for the non-overlapping region using the one or more second images. The controller generates 550 the depth information for the non-overlapping region using various depth-sensing techniques (e.g., structured light-based depth sensing, TOF-based depth sensing, active stereo vision depth sensing, or a hybrid depth sensing combining structured light-based depth sensing and TOF-based depth sensing). The determined depth information for the non-overlapping region may be stored in the depth model for the local area, along with the depth information for the first portion of the local area covered by the previous image frame. Accordingly, the depth model includes depth information for the entirety of the second portion of the local area. In this manner, the depth model can be expanded by adding new depth information associated with new non-overlapping regions of a local area as the camera assembly changes pose with time. Computing new depth information for only non-overlapping regions and saving a depth model of depth information for previously computes regions enables the DCA to track depth information of a local area more efficiently, thereby saving computational power.

Figure 6:
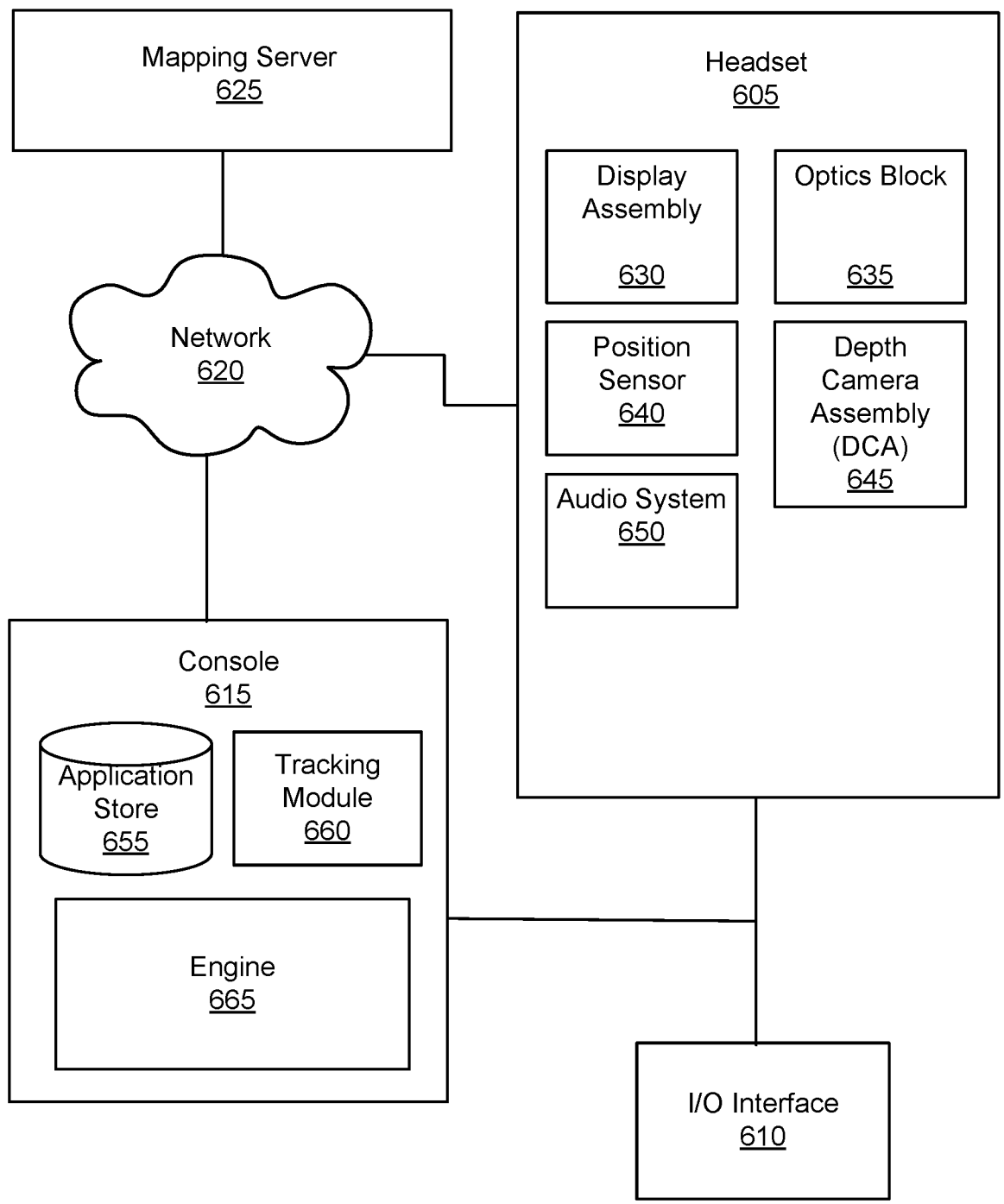
FIG. 6 is a system that includes a headset, in accordance with one or more embodiments.

FIG. 6 is a system 600 that includes a headset 605, in accordance with one or more embodiments. In some embodiments, the headset 605 may be the headset 100 of FIG. 1A or the headset 105 of FIG. 1B. The system 600 may operate in an artificial reality environment (e.g., a virtual reality environment, an augmented reality environment, a mixed reality environment, or some combination thereof). The system 600 shown by FIG. 6 includes the headset 605, an input/output (I/O) interface 610 that is coupled to a console 615, the network 620, and the mapping server 625. While FIG. 6 shows an example system 600 including one headset 605 and one I/O interface 610, in other embodiments any number of these components may be included in the system 600. For example, there may be multiple headsets each having an associated I/O interface 610, with each headset and I/O interface 610 communicating with the console 615. In alternative configurations, different and/or additional components may be included in the system 600. Additionally, functionality described in conjunction with one or more of the components shown in FIG. 6 may be distributed among the components in a different manner than described in conjunction with FIG. 6 in some embodiments. For example, some or all of the functionality of the console 615 may be provided by the headset 605.

The headset 605 includes the display assembly 630, an optics block 635, one or more position sensors 640, and the DCA 645. Some embodiments of headset 605 have different components than those described in conjunction with FIG. 6. Additionally, the functionality provided by various components described in conjunction with FIG. 6 may be differently distributed among the components of the headset 605 in other embodiments, or be captured in separate assemblies remote from the headset 605.

The display assembly 630 displays content to the user in accordance with data received from the console 615. The display assembly 630 displays the content using one or more display elements (e.g., the display elements 120). A display element may be, e.g., an electronic display. In various embodiments, the display assembly 630 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 635.

The optics block 635 may magnify image light received from the electronic display, corrects optical errors associated with the image light, and presents the corrected image light to one or both eyeboxes of the headset 605. In various embodiments, the optics block 635 includes one or more optical elements. Example optical elements included in the optics block 635 include: an aperture, a Fresnel lens, a convex lens, a concave lens, a filter, a reflecting surface, or any other suitable optical element that affects image light. Moreover, the optics block 635 may include combinations of different optical elements. In some embodiments, one or more of the optical elements in the optics block 635 may have one or more coatings, such as partially reflective or anti-reflective coatings.

Magnification and focusing of the image light by the optics block 635 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the optics block 635 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 635 corrects the distortion when it receives image light from the electronic display generated based on the content.

The position sensor 640 is an electronic device that generates data indicating a position of the headset 605. The position sensor 640 generates one or more measurement signals in response to motion of the headset 605. The position sensor 190 is an embodiment of the position sensor 640. Examples of a position sensor 640 include: one or more IMUs, one or more accelerometers, one or more gyroscopes, one or more magnetometers, another suitable type of sensor that detects motion, or some combination thereof. The position sensor 640 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 605 from the sampled data. For example, the IMU integrates the measurement signals received from the accelerometers over time to estimate a velocity vector and integrates the velocity vector over time to determine an estimated position of a reference point on the headset 605. The reference point is a point that may be used to describe the position of the headset 605. While the reference point may generally be defined as a point in space, however, in practice the reference point is defined as a point within the headset 605.

The DCA 645 generates depth information for a region of the local area. The DCA 645 is an embodiment of the DCA 200. The DCA includes one or more imaging devices, a projector, and a controller. The controller sends instructions to the projector assembly to illuminate the region of the local area and sends instructions to the one or more imaging devices to capture image data of the illuminated region. The image data is used to generate depth information about the region. The depth information of the region is added to a depth model of the local area.

The headset 605 uses the depth model generated by the DCA 645 as part of an artificial reality system. In some embodiments, the depth model about the local area around the headset 605 is used to generate or modify a virtual or augmented reality environment presented to the user of the headset 605 via the display assembly 630. The depth model can be used to prevent the user from hitting or walking into objects in the local area or otherwise potentially injuring themselves. For example, depth information in the depth model about real objects in the local area may be used to present virtual objects in the virtual environment.

The audio system 650 provides audio content to a user of the headset 605. The audio system 650 may comprise one or acoustic sensors, one or more transducers, and an audio controller. The audio system 650 may provide spatialized audio content to the user. In some embodiments, the audio system 650 may request acoustic parameters from the mapping server 625 over the network 620. The acoustic parameters describe one or more acoustic properties (e.g., room impulse response, a reverberation time, a reverberation level, etc.) of the local area. The audio system 650 may provide information describing at least a portion of the local area from e.g., the DCA 645 and/or location information for the headset 605 from the position sensor 640. The audio system 650 may generate one or more sound filters using one or more of the acoustic parameters received from the mapping server 625, and use the sound filters to provide audio content to the user.

The I/O interface 610 is a device that allows a user to send action requests and receive responses from the console 615. An action request is a request to perform a particular action. For example, an action request may be an instruction to start or end capture of image or video data, or an instruction to perform a particular action within an application. The I/O interface 610 may include one or more input devices. Example input devices include: a keyboard, a mouse, a game controller, or any other suitable device for receiving action requests and communicating the action requests to the console 615. An action request received by the I/O interface 610 is communicated to the console 615, which performs an action corresponding to the action request. In some embodiments, the I/O interface 610 includes an IMU that captures calibration data indicating an estimated position of the I/O interface 610 relative to an initial position of the I/O interface 610. In some embodiments, the I/O interface 610 may provide haptic feedback to the user in accordance with instructions received from the console 615. For example, haptic feedback is provided when an action request is received, or the console 615 communicates instructions to the I/O interface 610 causing the I/O interface 610 to generate haptic feedback when the console 615 performs an action.

The console 615 provides content to the headset 605 for processing in accordance with information received from one or more of: the DCA 645, the headset 605, and the I/O interface 610. In the example shown in FIG. 6, the console 615 includes an application store 655, a tracking module 660, and an engine 665. Some embodiments of the console 615 have different modules or components than those described in conjunction with FIG. 6. Similarly, the functions further described below may be distributed among components of the console 615 in a different manner than described in conjunction with FIG. 6. In some embodiments, the functionality discussed herein with respect to the console 615 may be implemented in the headset 605, or a remote system.

The application store 655 stores one or more applications for execution by the console 615. An application is a group of instructions, that when executed by a processor, generates content for presentation to the user. Content generated by an application may be in response to inputs received from the user via movement of the headset 605 or the I/O interface 610. Examples of applications include: gaming applications, conferencing applications, video playback applications, or other suitable applications.

The tracking module 660 tracks movements of the headset 605 or of the I/O interface 610 using information from the DCA 645, the one or more position sensors 640, or some combination thereof. For example, the tracking module 660 determines a position of a reference point of the headset 605 in a mapping of a local area based on information from the headset 605. The tracking module 660 may also determine positions of an object or virtual object. Additionally, in some embodiments, the tracking module 660 may use portions of data indicating a position of the headset 605 from the position sensor 640 as well as representations of the local area from the DCA 645 to predict a future location of the headset 605. The tracking module 660 provides the estimated or predicted future position of the headset 605 or the I/O interface 610 to the engine 665.

The engine 665 executes applications and receives position information, acceleration information, velocity information, predicted future positions, or some combination thereof, of the headset 605 from the tracking module 660. Based on the received information, the engine 665 determines content to provide to the headset 605 for presentation to the user. For example, if the received information indicates that the user has looked to the left, the engine 665 generates content for the headset 605 that mirrors the user's movement in a virtual local area or in a local area augmenting the local area with additional content. Additionally, the engine 665 performs an action within an application executing on the console 615 in response to an action request received from the I/O interface 610 and provides feedback to the user that the action was performed. The provided feedback may be visual or audible feedback via the headset 605 or haptic feedback via the I/O interface 610.

The network 620 couples the headset 605 and/or the console 615 to the mapping server 625. The network 620 may include any combination of local area and/or wide area networks using both wireless and/or wired communication systems. For example, the network 620 may include the Internet, as well as mobile telephone networks. In one embodiment, the network 620 uses standard communications technologies and/or protocols. Hence, the network 620 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 620 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 620 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 625 may include a database that stores a virtual model describing a plurality of spaces, wherein one location in the virtual model corresponds to a current configuration of a local area of the headset 605. The mapping server 625 receives, from the headset 605 via the network 620, information describing at least a portion of the local area and/or location information for the local area. The mapping server 625 determines, based on the received information and/or location information, a location in the virtual model that is associated with the local area of the headset 605. The mapping server 625 determines (e.g., retrieves) one or more acoustic parameters associated with the local area, based in part on the determined location in the virtual model and any acoustic parameters associated with the determined location. The mapping server 625 may transmit the location of the local area and any values of acoustic parameters associated with the local area to the headset 605.

Some Embodiments of a Projector Assembly

Figure 7:
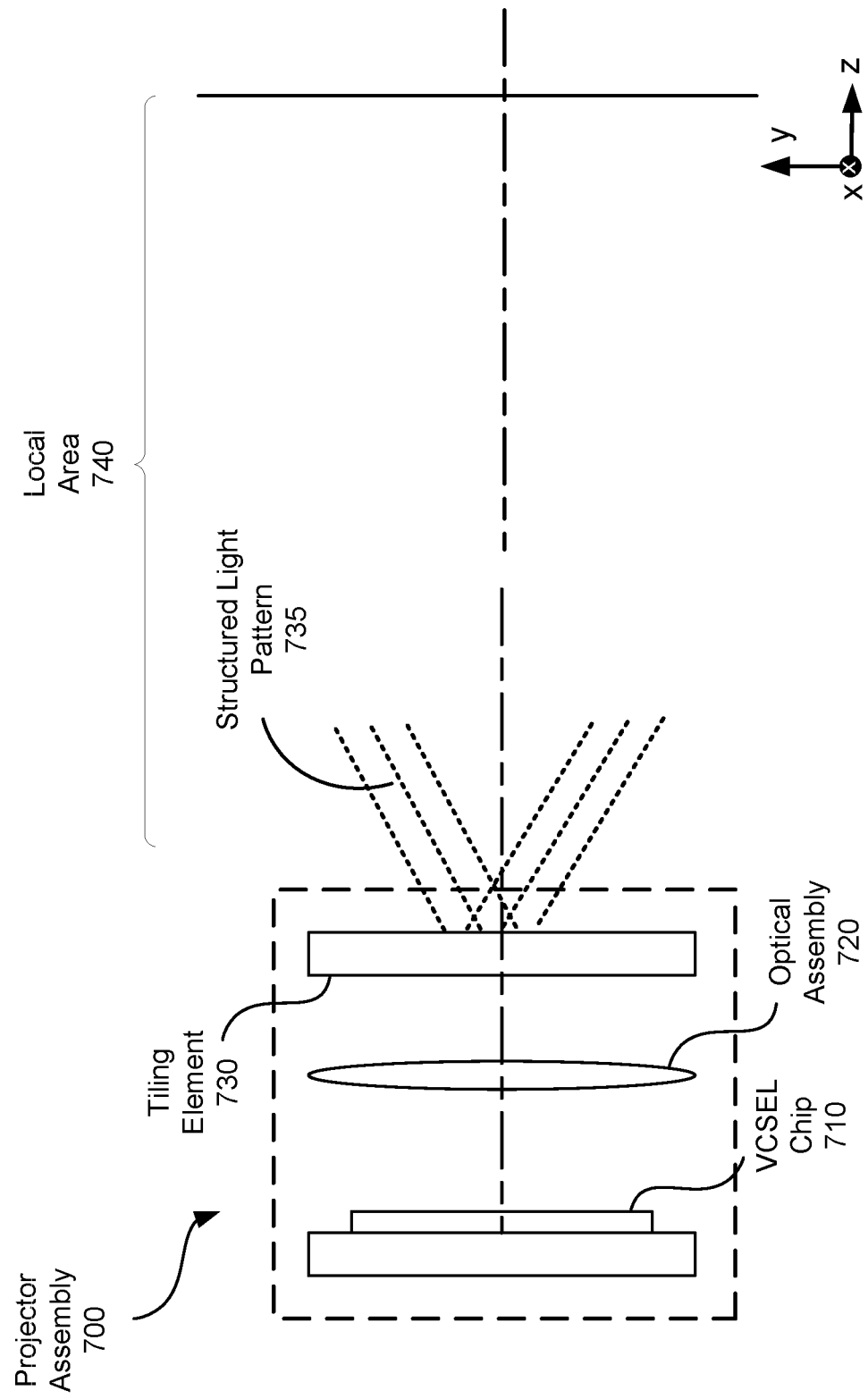
FIG. 7 is a schematic side view of a projector assembly, in accordance with one or more embodiments.

FIG. 7 is a schematic side view of a projector assembly 700, in accordance with one or more embodiments. In some embodiments, the projector assembly 700 may be an embodiment of a projector assembly discussed above (e.g., the projector assembly 220, the projector assembly of the DCA 645, etc.). The projector assembly 700 comprises at least one VCSEL chip 710, an optical assembly 720, and a tiling element 730. The projector assembly 710 is part of a DCA (e.g., the DCA 305, the DCA 645). The projector assembly 700 generates a structured light pattern 735 and projects the structured light pattern 735 into a local area 740 in accordance with instructions from the depth camera assembly.

The VCSEL chip 710 is configured to emit light in accordance with instructions from the DCA. The VCSEL chip 710 includes an array of VCSELs. The array of VCSELs is divided into a plurality of groups. Each group is individually addressable and includes at least one VCSEL of the array of VCSELs. In some embodiments, each VCSEL is individually addressable (i.e., each group only includes a single VCSEL, and any combination of the plurality of VCSELs may emit light). Each VCSEL of the array of VCSELs emits in an optical band. The optical band may be, e.g., a visible band (~380 nm to 750 nm), in an infrared (IR) band (~750 nm to 1,800 nm), in an ultraviolet band (~100 nm to 380 nm), some other portion of the electromagnetic spectrum that the camera assembly 315 is configured to detect, or some combination thereof. In some embodiments, the different groups of VCSELs may emit light at different wavelengths. Additionally, in some embodiments, different groups of VCSELs may have different polarizations. For example, the VCSELs can be designed to operate at a single linear polarization; the polarization can be further changed to circular polarization by following a quarter-wave plate. Note, while a single VCSEL chip 710 is shown, in other embodiments, multiple VCSEL chips may be part of the projector assembly 300. In some embodiments, the array of VCSELs are laid out in a grid. However, in other embodiments, the array of VCSELs may be laid out in some other manner (e.g., triangular, etc.).

The optical assembly 720 conditions the light emitted from the VCSEL chip 710. The optical assembly 720 includes one or more optical elements that condition the light to form one or more beams of conditioned light. Conditioning the light prepares the light for the tiling element 730. An optical element may be, e.g., a lens, a filter, diffractive and/or metasurfaces, flat optics components based on diffractive optics and/or metasurfaces technology, or some combination thereof. Conditioning the light may include, e.g., collimating the light, filtering the light, correcting distortion and/or aberration, or some combination thereof. For example, the optical assembly 720 may collimate the light from the VCSEL chip 710, and provide the collimated light to the tiling element 730. The collimated light includes a beam of light for each VCSEL emitting light in the VCSEL chip 710.

The tiling element 730 generates the structured light pattern 735 that is projected into the local area 740. The tiling element 730 generates a tile of the structured light pattern 735 for each beam of conditioned light (i.e., light from each of the active VCSELs). The tiling element 730 is a diffractive optical element (DOE). The DOE may be, e.g., a 1D or a 2D grating. The DOE is configured to generate a tile for each beam of conditioned light that is incident upon it. As illustrated the DOE is transmissive, but in other embodiments, the DOE may be reflective. The DOE diffracts each beam of conditioned light to form a corresponding dot pattern (i.e., turns each single beam of light into a 2D array of beams of light) within a corresponding tile. Accordingly, in some embodiments, each VCSEL of the array of VCSELs is associated with a different tile, and all of the tiles have a same dot pattern. The tiling element 730 projects the generated tiles into the local area 740 and the tiles in the local area 740 form the structured light pattern 735.

In some embodiments, the beams of conditioned light from VCSELs that are next to each other produce tiles that share a border, but do not substantially overlap in the local area 740. In this manner, a grid of VCSELs can produce array of tiles where each tile covers a different portion of the local area 740, thereby forming a seamless structured light pattern of constant density. In some embodiments, beams of conditioned light from VCSELs that are next to each other produce tiles that partially or fully overlap within the local area 740. In this manner, a density of the structured light pattern 735 in the area of the overlapping tiles can be increased (e.g., to provide better resolution). Note that as each tile in the local area 740 corresponds to a particular VCSEL being active, the DCA is able dynamically control what areas of the local area 740 are illuminated with the structured light pattern 735. And in some embodiments, the DCA may also be able to dynamically adjust a density of the structured light pattern 735 such that different portions of the local area 740 are illuminated with structured light patterns of different densities.

In some embodiments, the projector assembly 700 may project the structured light pattern 735 over the entire field of view of the projector assembly 700, or the projector assembly 700 may project tiles over some, but not all of the field of view. For example, the structured light pattern 735 may be formed from a plurality of tiles that are each projected into a respective portion of the field of view of the projector assembly 700. The plurality of tiles together form the entire structured light pattern 735 (and in some cases there may be some inactive tiles—e.g., as discussed below with regard to FIG. 8). In some embodiments, each tile of the structured light pattern may be individually adjusted. For example, in response to a change in condition (e.g., object of low reflectivity moves from an area covered by a second tile to an area covered by a first tile) at a given instant in time, the projector assembly 700 may increase the intensity (e.g., by increasing drive current) of a first tile of the structured light pattern 735, and may decrease the intensity (e.g., by decreasing drive current) of a second tile of the structured light pattern 735. In another example, the drive current (i.e., intensity) for VCSELs may be higher for outdoor applications in the day, relative to, e.g., operations outside at night and/or indoor. For each portion of the field of view of the projector assembly 700, the projector assembly 700 may adjust any suitable property of the structured light pattern 735, such as the intensity, density, polarization, blink rate, number of active tiles, etc. In some embodiments, the structured light pattern may be time multiplexed, such that different tiles are projected into different portions of the field of view at different times.

In some embodiments, the projector assembly may also include a steering element that functions to steer the structured light pattern 735, thereby allowing the projector assembly to place the structured light pattern 735 within a particular portion of the local area 740. In some embodiments, the steering element is positioned between the optical assembly 720 and the tiling element 730, and steers the conditioned beams of light before they are incident on the tiling element 730. The steering element is an active component, and may be, e.g., an electrically switchable prism grating using liquid crystal, polarization grating based on geometric phase, a switchable grating based on metasurface, some other active component that can shift light, or some combination thereof. Temporally, the shifted structured light pattern may be captured (e.g., via a camera assembly of the DCA) in different frames so as to effectively increase a lateral and/or vertical resolution of the resultant depth maps. Note that in some instances, light from the VCSELs may be polarized, and this polarization may be used by the steering element to facilitate steering of the structured light pattern. For example, one implementation is the use of a liquid crystal based switchable prism with linearly polarized VCSEL emitters; another implementation is the switchable polarization grating with a circularly-polarization input beam. In some embodiments using a polarization-insensitive steering element no special control of the VCSEL beam polarization is used.

Note conventional projection systems generally lack spatial and/or temporal flexibility. For example, they generally fully illuminate a scene with structured light. Moreover, conventional projection systems generally do not have an ability to selective illuminate particular areas of the scene with structured light. In contrast, the projector assembly 700 can selectively illuminate areas of the local area. And in some embodiments, the projector assembly 700 may actively scan and/or steer (e.g., via selective activation of VCSELs individually, column-wise, row-wise, diagonal-wise, or in some other fashion, etc.) the structured light pattern over some portion of the local area. Accordingly, the projector assembly 700 may have substantial advantages in power saving relative to conventional projection systems.

Figure 8:
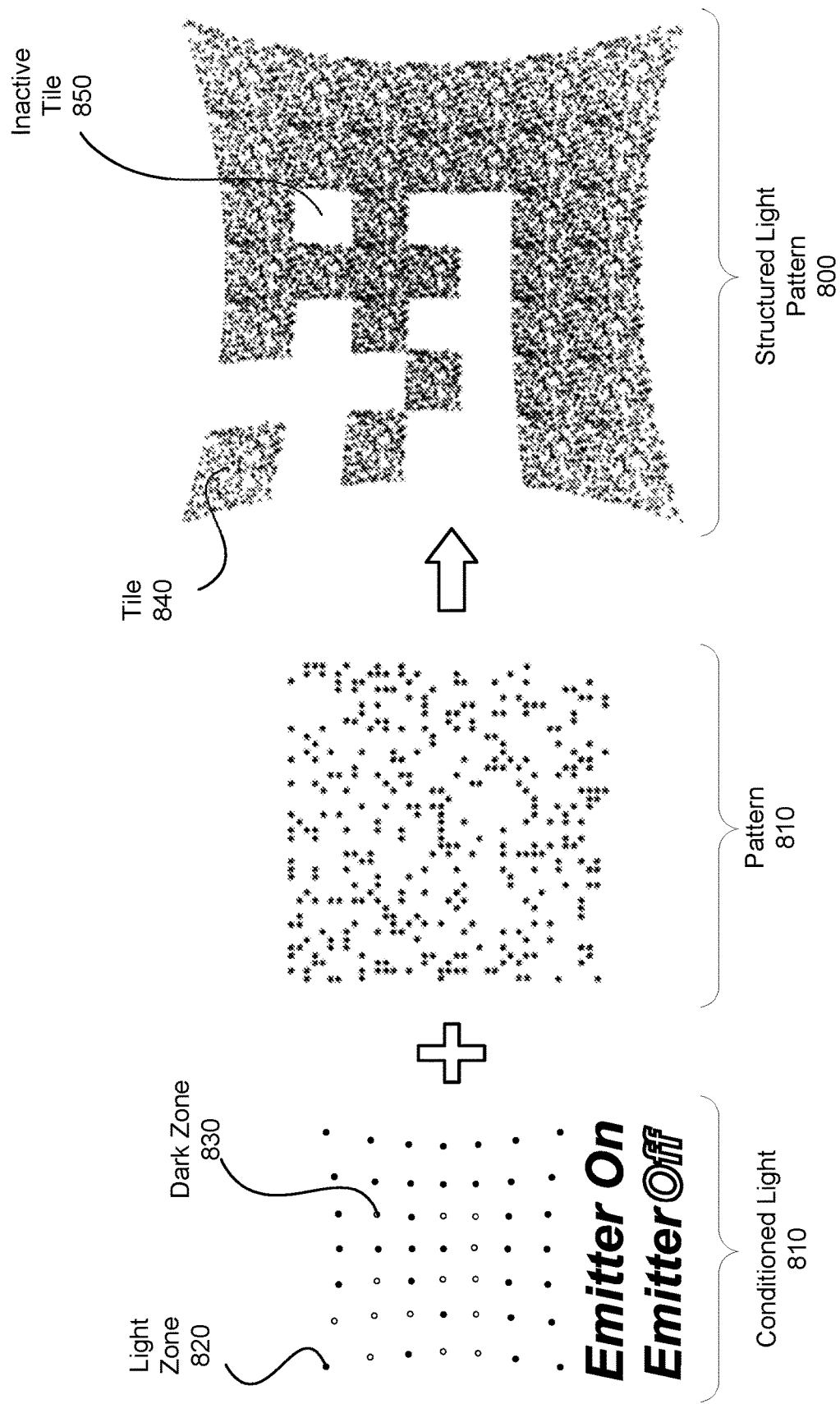
FIG. 8 illustrates formation of an example structured light pattern, in accordance with one or more embodiments.

FIG. 8 illustrates formation of an example structured light pattern 800, in accordance with one or more embodiments.

As noted above with reference to FIG. 7, a VCSEL chip emits one or more beams of light in accordance with instructions from a DCA. And each beam of light is from an active VCSEL. An inactive VCSEL does not produce a beam of light. And the instructions from the DCA (e.g., the controller 230) control which VCSELs are active and which VCSELs are inactive.

The one or more beams of light are conditioned by an optical assembly (e.g., the optical assembly 720) to produce conditioned light 810. The conditioned light 810 includes one or more light zones, e.g., light zone 820, and may also include one or more dark zones like, e.g., dark zone 830. Each light zone is a conditioned light beam from a respective active VCSEL. Note that some of the VCSELs may be inactive such that they are not emitting light resulting in a respective dark zone, e.g., the dark zone 830. The pincushion distortion in the conditioned light 810 is caused by the optical assembly. In some embodiments, it may be offset in part by adjusting a layout of the array of VCSELs on the VCSEL chip and/or including optical elements in the optical assembly that correct for pincushion.

A tiling element (e.g., the tiling element 730) generates the structured light pattern 800 using the conditioned light 810. The tiling element generates a tile for each of the light zones in the conditioned light 810. The tiling element is a DOE that transforms each single beam of conditioned light into a corresponding tile using a pattern. In the illustrated example, the pattern used to transfer the conditioned light into corresponding tiles is the pattern 810. In other embodiments, the pattern may be different. For example, the pattern may have a higher/lower density, diffract light by different amounts, etc. Note that the pattern is applied to each beam of conditioned light to form a plurality of tiles that are projected into a local area to form the structured light pattern 800. The structured light pattern is formed from one or more tiles and may also include one or more inactive tiles. As noted above, each tile is formed from light from a corresponding single VCSEL in the VCSEL chip. In some cases, the single VCSEL may be inactive, such that no light is emitted, resulting in an inactive tile. In the illustrated example, each dark zone has a corresponding inactive tile. For example, the dark zone 830 corresponds to an inactive tile 850.

Note that the structured light pattern 800 is generated such that each tile and/or inactive tile do/does not substantially overlap. As discussed below with regard to FIG. 9, in some embodiments, tiles overlap to form regions of variable density.

Figure 9:
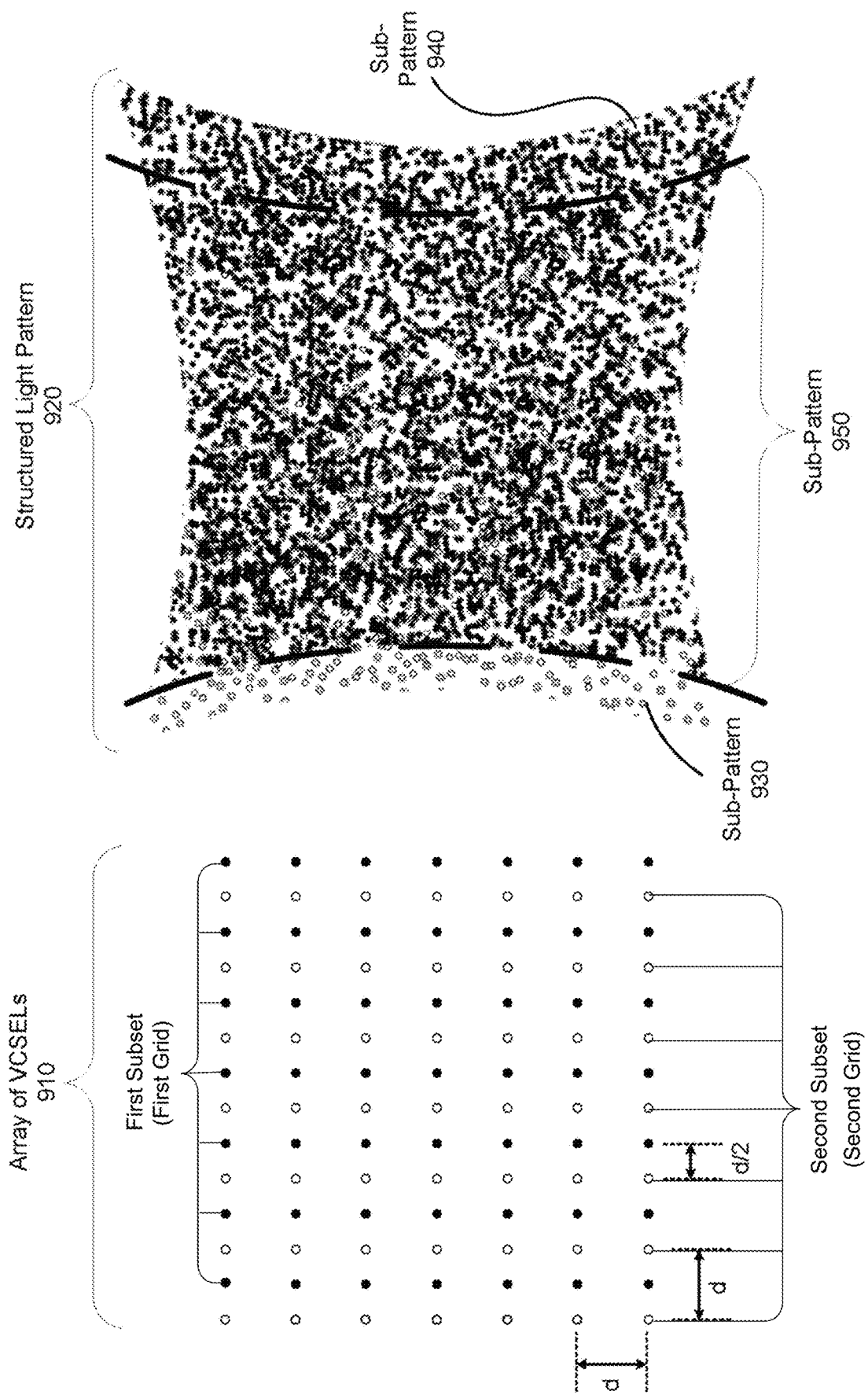
FIG. 9 illustrates a relationship between an array of VCSELs and a structured light pattern, in accordance with one or more embodiments.

FIG. 9 illustrates a relationship between an array of VCSELs 910 and a structured light pattern 920, in accordance with one or more embodiments. A projector assembly (e.g., the projector assembly 700) includes the array of VCSELs 910. The array of VCSELs 910 includes VCSELs arranged in a grid. The grid has 14 columns and 7 rows. Note that a spacing, d/2, between adjacent columns of VCSELs in the grid is smaller than a spacing, d, between adjacent rows of VCSELs. The difference in spacing enables the projection assembly to e.g., laterally shift a structured light pattern of constant density or generate a structured light pattern with variable density. Note if the spacing was also reduced between adjacent rows to match the spacing between adjacent columns, the projection assembly could also vertically shift a structured light pattern of constant density. As illustrated in FIG. 9 all columns of VCSELs are active. In other embodiments, some subset of the array of VCSELs are active with others being inactive. And the illustrated spacing between VCSELs is such that if only odd columns of the grid are active a first structured light pattern of a constant density is formed (e.g., similar to the structured light pattern 800 where all of its tiles are active). And in cases where only even columns of the grid are active a second structured light pattern of constant density is formed, the second structured light pattern is the same as the first structured light pattern, but is shifted to the right.

In the illustrated embodiment, the structured light pattern 920 is formed from all of the array of VCSELS 910 being active. The structured light pattern 920 is one of variable density, and is formed from a sub pattern 930, a sub pattern 940, and a sub pattern 950. The sub-pattern 940 is formed using light from column 1 of the array of VCSELs 910, and the sub-pattern 940 is formed using light from column 14 of the array of VCSELs 910. The sub-pattern 950 is formed using light from columns 2-13 of the array of VCSELS 910. As individual tiles from VCSELs from columns 2-13 partially overlap, the density of light beams within tiles of the sub-pattern 950 is higher (up to twice as high) than the density of light beams within tiles of the sub-pattern 930 and the sub-pattern 940. Note that in embodiments where the projector assembly also includes a steering element, the structured light pattern 920 may be further steered to different locations within the local area.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A projector assembly comprising:
an array of vertical cavity surface emitting lasers (VCSELs) including a first subset of VCSELs positioned in accordance with a first layout and a second subset of VCSELs positioned in accordance with a second layout, wherein the second layout is shifted from the first layout along a first dimension; and
a tiling element configured to generate a respective structured light (SL) tile for each of the VCSELS in the array of VCSELs, and each respective SL tile is associated with a different location in a field of view of the projector assembly,
wherein SL tiles formed from light from the first subset of VCSELs forms a first SL pattern and SL tiles formed from light from the second subset of VCSELs forms a second SL pattern, and the second SL pattern is laterally shifted from the first SL pattern along the first dimension.

2. The projector assembly of claim 1, wherein each VCSEL of the array of VCSELs is individually addressable.

3. The projector assembly of claim 1, wherein each SL tile formed from the first subset of VCSELs has a same pattern.

4. The projector assembly of claim 1, wherein each SL tile formed from the second subset of VCSELs has the same pattern.

5. The projector assembly of claim 1, wherein the first SL pattern overlaid with the second SL pattern forms a SL pattern, and the SL pattern includes a first sub-pattern that has a first feature density, and a second sub-pattern that has a second feature density that is higher than the first feature density.

6. The projector assembly of claim 5, wherein the first sub-pattern is formed from a portion of the first SL pattern, and the second sub-pattern is formed from a different portion of the first SL pattern that is overlaid with a portion of the second SL pattern.

7. The projector assembly of claim 1, wherein the first layout is a first grid, and the second layout is a second grid, and rows of the first grid and rows of the second grid overlap, and columns of the first grid and columns of the second grid are separated by a pitch distance.

8. The projector assembly of claim 7, wherein adjacent rows of the first grid are separated by the pitch distance.

9. The projector assembly of claim 7, wherein adjacent VCSELs in the first grid are separated by the pitch distance, and adjacent VCSELs in the second grid are separated by the pitch distance.

10. The projector assembly of claim 9, wherein VCSELs in the first grid that are adjacent to VCSELs in the second grid, and are in a same row, are separated by a second distance that is less than the pitch distance.

11. The projector assembly of claim 10, wherein the second distance is half the pitch distance.

12. The projector assembly of claim 1, wherein the tiling element is a diffraction grating.

13. The projector assembly of claim 1, wherein a layout of the array of VCSELs mitigates pincushion distortion in the first SL pattern and in the second SL pattern.

14. A sensor comprising:
- an array of vertical cavity surface emitting lasers (VCSELs) including a first subset of VCSELs positioned in accordance with a first layout and a second subset of VCSELs positioned in accordance with a second layout, wherein the second layout is shifted from the first layout along a first dimension;
- wherein a tiling element is configured to use light from the array of VCSELs to generate a respective structured light (SL) tile for each of the VCSELS in the array of VCSELs, and each respective SL tile is associated with a different location in a field of view of the projector assembly, and
- wherein SL tiles formed from light from the first subset of VCSELs forms a first SL pattern and SL tiles formed from light from the second subset of VCSELs forms a second SL pattern, and the second SL pattern is laterally shifted from the first SL pattern along the first dimension.

15. The sensor of claim 14, wherein each VCSEL of the array of VCSELs is individually addressable.

16. The sensor of claim 14, wherein the first layout is a first grid, and the second layout is a second grid, and rows of the first grid and rows of the second grid overlap, and columns of the first grid and columns of the second grid are separated by a pitch distance.

17. The sensor of claim 16, wherein adjacent rows of the first grid are separated by the pitch distance.

18. The sensor of claim 17, wherein adjacent VCSELs in the first grid are separated by the pitch distance, and adjacent VCSELs in the second grid are separated by the pitch distance.

19. The sensor of claim 18, wherein VCSELs in the first grid that are adjacent to VCSELs in the second grid, and are in a same row, are separated by a second distance that is less than the pitch distance.

20. The sensor of claim 14, wherein a layout of the array of VCSELs mitigates pincushion distortion in the first SL pattern and in the second SL pattern.

* * * * *